H. MOORE.
VALVE GRINDER.
APPLICATION FILED MAY 16, 1912.
1,066,307.
Patented July 1, 1913.
2 SHEETS—SHEET 2.
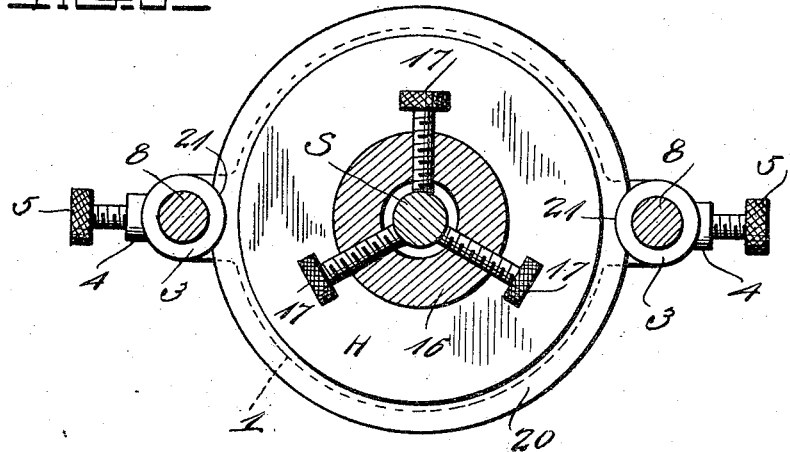
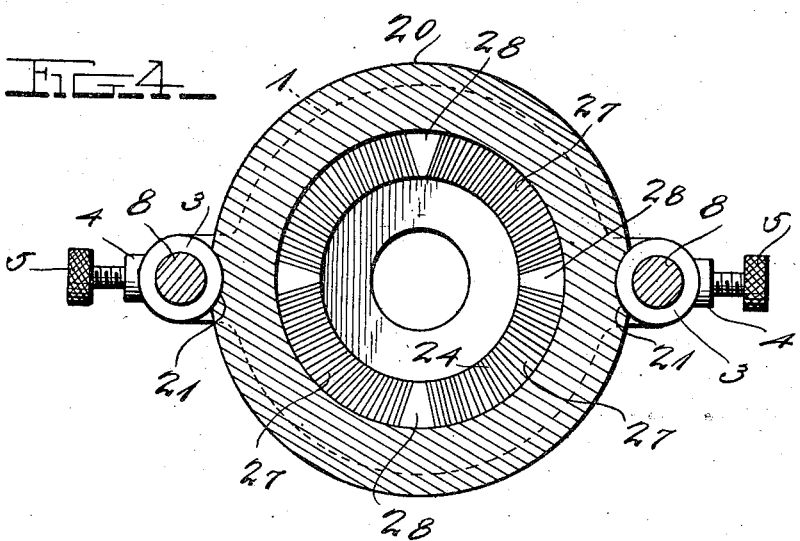
Witnesses
J. R. Pierce
N. L. Collamer
Inventor
Hiram Moore
by H. B. Willson & Co.
Attorneys ary with the next face 23, and so on. Internally the die of this improved machine has a plurality of grinding faces

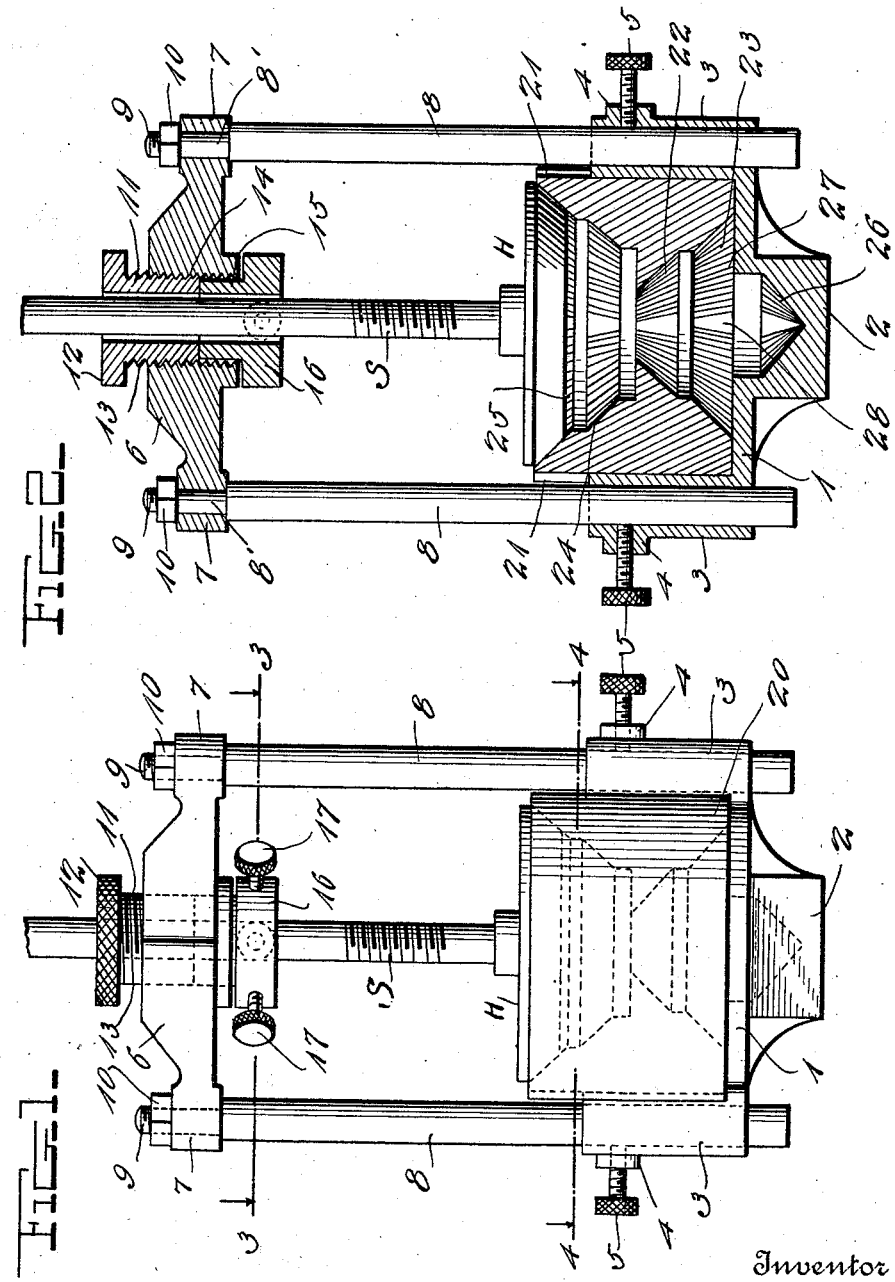

UNITED STATES PATENT OFFICE.

HIRAM MOORE, OF HANCOCK, MICHIGAN.

VALVE-GRINDER.

1,066,307.  Specification of Letters Patent.  Patented July 1, 1913.

Application filed May 16, 1912. Serial No. 697,716.

*To all whom it may concern:*

Be it known that I, HIRAM MOORE, a citizen of the United States, residing at Hancock, in the county of Houghton and State of Michigan, have invented certain new and useful Improvements in Valve-Grinders; and I do declare the following to be a full, clear, and exact description of the invention, such as will enable others skilled in the art to which it appertains to make and use the same.

This invention is a machine for grinding curved surfaces; and more especially it is intended for grinding the conical valves or disks which form the heads of valves of that class ordinarily employed in gasolene engines.

The object of the same is to produce a machine which can be readily adapted to valves of various sizes, both as to the length of their stems and the diameter of their heads, and one in which the stem can be accurately centered so that the beveled face of the head will be ground on a true circle around the axis of the stem. This and other objects are accomplished by constructing the machine in the manner hereinafter more fully described and claimed, and as shown in the drawings wherein—

Figure 1 is a side elevation of this device complete, and Fig. 2 a central vertical sectional view thereof; Figs. 3 and 4 are cross sections on the lines 3—3 and 4—4 respectively of Fig. 1.

The framework of this machine comprises a base and a yoke adjustably mounted thereon. The base includes a flat bottom plate 1 with an integral depending hub 2, and the former may well be circular and the latter square as shown, the plate extended at opposite sides and rising thence in two tubular uprights 3 each having an internally threaded boss or nut 4 for receiving a set screw 5. The yoke comprises a transverse head 6 having two opposite perforated ears 7, and two yoke arms 8 which are by preference upright rods adjustably mounted in the uprights 3 under the tips of the set screws 5 and having their upper ends reduced as at 8 and threaded as at 9 for the reception of nuts 10 whereby they are detachably mounted in the ears of the yoke. Ordinarily their upper ends are not disconnected from the yoke, but when it is desired to adjust the height of the yoke head from the base, the set screws 5 are loosened and the yoke arms moved upward or downward within the uprights 3, after which the set screws are again tightened. I have not considered it necessary in the present application to illustrate and describe the means for supporting this machine or for rotating the stem S of the valve whose conical head H is to be ground, as any suitable form of support may be employed and the stem can be rotated in any suitable way either by hand or by power.

The feed mechanism by which the valve is pressed downward toward the die, comprises a tubular bushing 11 having a knurled head 12 at its upper end and externally threaded at its lower end as at 13 to engage a threaded aperture 14 at the center of the yoke head 6; and a collar 15 fitting revolubly in the lower end of said aperture and itself having an enlarged head 16 below the yoke head 6, through which several set screws 17 pass so that their tips engage the stem S of the valve which can thus be accurately centered within the collar. By screwing the bushing downward into the aperture 14, the collar 15 is pushed downward with it, and since the collar is clamped on the valve stem the valve is fed downward toward the die in a manner which will be clear.

The die of this improved machine has a body which externally is preferably cylindrical as shown at 20 and rather thick or high, being provided with two diametrically opposite upright grooves 21 adapted to detachably engage between the two uprights 3 at opposite sides of the base when said body is dropped into place upon the bottom plate 1 thereof. Internally the die is provided with a plurality of grinding faces herein indicated by the numerals 22, 23, 24 and 25, and made respectively larger step by step so that any valve head H which is of a size to be ground on one of said faces can be handled by this machine by setting the die with that face uppermost. The two smaller faces 22 and 23 are by preference cut in one end of the die, and the larger faces 24 and 25 in the other end thereof, the smaller of each pair being of course disposed toward the center of the die and the larger toward its extreme ends. A valve head sufficiently small, for instance, to pass through the die-face 25 will drop upon the die-face 24, or if that be too large, the die is reversed, when the valve will doubtless fit the face 23 or 22 and be ground when the valve is rotated; and if none of the faces in the particular die illustrated will serve the purpose, some other die may readily be substituted. I have shown the present die as having four faces—it is obvious that it could have more or less. I have also shown a supplemental die 26 cut in the center of the base plate 1 itself—a construction which may sometimes be followed and in which case the hub 2 becomes necessary. It is quite possible that the base could have a series of die faces like either end of the die itself, and with such a base and two or three dies almost any ordinary valve could be ground. In each case the numeral 27 designates fine serrations preferably inclined slightly from a true radius, and the numeral 28 designates a clear space between the extremities of the serrations, which latter are inclined in one direction for about half the circle, and in the other direction for about the other half so that the grindings (whichever way the valve is turned) are brought to one of said clear spaces wherein they accumulate and from which they can be removed from time to time.

The operation of my machine will now be obvious.

When a valve is to be ground, the die having the proper face is inserted by passing it over the base and dropping its two grooves 21 down so as to engage the two uprights 3 until it rests upon the base plate 1 of the framework. A collar 15 is clamped upon the valve stem S by means of the set screws 17 and accurately centered thereon, the collar is inserted in the upper end of the aperture 14 in the yoke, and the yoke with its two arms 8 is brought into position and the arms passed into the tubular uprights and adjusted therein by means of the set screws 5, which movement will cause the head H of the valve to pass down into the die and rest upon the proper face therein. The upper extremity of the valve stem S is now rotated by hand or otherwise which causes the head H to rotate within the face and its beveled face to engage the serrations 27 therein, no matter which way the valve is rotated. This is kept up until the rounded corners of the valve head have been ground off and its head is strictly and truly ground concentric with the axis of its stem; and from time to time by turning the bushing 11 whose treads 13 engage the threads 14 in the aperture within the yoke, the collar 15 is caused to descend and with it the valve stem and therefore its head, which latter is of course dropped and forced more and more firmly against the serrated grinding surface 27. After the head has been sufficiently ground, the parts are disconnected by a reversal of the above operation, and a new valve inserted in the manner described, the parts readjusted, and the grinding continued. All parts are by preference of metal and their dimensions and proportions will correspond with the work to be done; although I have reserved the right to make changes in details such as come within the sphere of this invention as claimed below.

What is claimed as new is:—

1. In a valve grinder, the combination with a framework including a base plate and oppositely disposed uprights thereon, and a valve-feeding mechanism disposed above said plate; of a die whose body is adapted to pass between said uprights and is provided externally with oppositely disposed grooves slidably engaging them, its interior having die-faces of different sizes at its opposite ends.

2. In a valve grinder, the combination with a frame-work including a base plate and oppositely disposed uprights thereon, and a valve feeding mechanism disposed above said plate; of a die whose body is adapted to pass between said uprights and is provided externally with oppositely disposed grooves slidably engaging them, its interior being provided with a series of die-faces opening out both ends of the die-body and growing larger in size from the center thereof toward each end.

3. In a valve grinder, the combination with a base comprising a bottom plate having a central depending hub and cut in its upper surface with a die face extending downwardly into said hub, and a double-ended die removably mounted upon said bottom plate and whose faces differ in size from that of the face in the plate; of a yoke whose arms are connected with opposite sides of said plate, and valve-feeding mechanism carried by the head of the yoke.

4. In a valve grinder, the combination with a base comprising a bottom plate having a central depending hub and cut in its upper surface with a die face extending downwardly and a die removably mounted upon said bottom plate; of tubular uprights rising from opposite sides of said plate, a set screw passing inward into the bore of each, a yoke comprising a head and two yoke arms detachably engaging said uprights and adjustable under the set screws therein, and a valve-feeding mechanism carried by the yoke.

5. In a valve grinder, the combination with a framework including a yoke head and base, the former having a central upright threaded aperture, and means for connecting the head removably with said base; of a threaded bushing engaging the upper end of said aperture in the yoke-head, a collar revolubly mounted in the lower end of said aperture beneath the bushing and having an enlarged head beneath the yoke head, and means carried by the collar for centering the valve-stem therein.

6. In a valve grinder, the combination with a framework including a head and base, the former having a central upright aperture threaded at its upper end, and means for connecting it removably with said base; of a threaded bushing engaging the upper end of said aperture in the yoke-head, a collar loosely engaging the lower end of said aperture beneath the bushing, a head at the lower end of the collar having a plurality of radial threaded openings therein, and set screws passing inward through said openings and adapted to engage the valve stem and center the latter within the collar, for the purpose set forth.

7. In a valve grinder, the combination with a bottom plate, and a double-ended die removably and reversibly mounted upon said plate; of tubular uprights rising from opposite sides of said plate, a set screw passing inward into the bore of each, a yoke comprising a head and two yoke arms detachably engaging said uprights and adjustable under the set screws therein, and a valve-feeding mechanism carried by the yoke.

In testimony whereof I have hereunto set my hand in presence of two subscribing witnesses.

HIRAM MOORE.

Witnesses:
 CON. T. HARRINGTON,
 MARION HARRINGTON.

Copies of this patent may be obtained for five cents each, by addressing the "Commissioner of Patents, Washington, D. C."